US012695233B2

(12) United States Patent
Miyamura et al.

(10) Patent No.: US 12,695,233 B2
(45) Date of Patent: Jul. 28, 2026

(54) FEMALE CONNECTOR

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Tetsuya Miyamura, Mie (JP); Hideto Nakamura, Mie (JP); Daisuke Saito, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 355 days.

(21) Appl. No.: 18/686,853

(22) PCT Filed: Aug. 18, 2022

(86) PCT No.: PCT/JP2022/031257
§ 371 (c)(1),
(2) Date: Feb. 26, 2024

(87) PCT Pub. No.: WO2023/032699
PCT Pub. Date: Mar. 9, 2023

(65) Prior Publication Data

US 2024/0396247 A1 Nov. 28, 2024

(30) Foreign Application Priority Data

Sep. 2, 2021 (JP) ................................ 2021-143001

(51) Int. Cl.
*H01R 13/424* (2006.01)

(52) U.S. Cl.
CPC .................................. *H01R 13/424* (2013.01)

(58) Field of Classification Search
CPC .... H01R 13/424; H01R 13/11; H01R 13/187; H01R 13/04; H01R 13/113; H01R 13/114; H01R 13/26
(Continued)

(56) References Cited

U.S. PATENT DOCUMENTS

2016/0013586 A1 1/2016 Kamei
2016/0134044 A1* 5/2016 Hirakawa ............ H01R 13/187 439/816
(Continued)

FOREIGN PATENT DOCUMENTS

JP H08-007968 A 1/1996
JP 2002151220 A * 5/2002
(Continued)

OTHER PUBLICATIONS

International Search Report issued on Nov. 1, 2022 for WO 2023/032699 A1 (4 pages).

*Primary Examiner* — Tulsidas C Patel
*Assistant Examiner* — Jeffrey Mountain
(74) *Attorney, Agent, or Firm* — Venjuris, P.C.

(57) ABSTRACT

The structure of a female terminal fitting can be simplified. A female connector (1) is provided with a housing (10) and a female terminal fitting (20) to be accommodated into the housing (10). The female terminal fitting (20) includes a spring member (50) having a pair of resilient pieces (52, 53) and a flat plate member (60). The spring member (50) is provided with an accommodation space (55) between the pair of resilient pieces (52, 53). The flat plate member (60) and a male terminal fitting (82) enter the accommodation space (55) to be connected. The accommodation space (55) is open to face an inner side wall (44D) of the housing (10).

6 Claims, 15 Drawing Sheets

(58) Field of Classification Search
USPC ........................................................ 439/733.1
See application file for complete search history.

(56) References Cited

U.S. PATENT DOCUMENTS

| | | | | |
|---|---|---|---|---|
| 2016/0190726 | A1 | 6/2016 | Kamei | |
| 2020/0403342 | A1* | 12/2020 | Nishijima | H01R 13/193 |

FOREIGN PATENT DOCUMENTS

| | | | |
|---|---|---|---|
| JP | 2005222767 | A * | 8/2005 |
| JP | 2011-238558 | A | 11/2011 |
| JP | 2014-235849 | A | 12/2014 |
| JP | 2021-018858 | A | 2/2021 |

* cited by examiner

FEMALE CONNECTOR

CROSS REFERENCE TO RELATED APPLICATIONS

This application is a national phase of PCT application No. PCT/JP2022/031257, filed on 18 Aug. 2022, which claims priority from Japanese patent application No. 2021-143001, filed on 2 Sep. 2021, all of which are incorporated herein by reference.

TECHNICAL FIELD

The present disclosure relates to a female connector.

BACKGROUND

A female terminal fitting disclosed in Patent Document 1 is formed by bending a metal plate material. The female terminal fitting includes a terminal connecting portion and a wire connecting portion. The terminal connecting portion is in the form of a rectangular tube accommodating a resilient piece to be held in contact with a tab of a male terminal. The wire connecting portion is provided behind the terminal connecting portion.

PRIOR ART DOCUMENT

Patent Document

Patent Document 1: JP 2014-235849 A

SUMMARY OF THE INVENTION

Problems to be Solved

However, in the configuration of Patent Document 1, the female terminal fitting has a complicated shape by including the terminal connecting portion in the form of a rectangular tube. As the shape of such a female terminal fitting becomes more complicated, the use amount of the material increases and the number of process steps such as bending for formation increases. This leads to a cost increase.

The present disclosure was completed on the basis of the above situation and aims to enable the structure of a female terminal fitting to be simplified.

Means to Solve the Problem

The present disclosure is directed to a female connector with a housing and a female terminal fitting to be accommodated into the housing, the female terminal fitting including a spring member having a pair of resilient pieces and a flat plate member to be held in contact with the resilient pieces, the spring member being provided with an accommodation space between the pair of resilient pieces, the flat plate member and a mating terminal entering the accommodation space to be connected, and the accommodation space being open to face an inner side wall of the housing.

Effect of the Invention

According to the present disclosure, the structure of a female terminal fitting can be simplified.

DETAILED DESCRIPTION TO EXECUTE THE INVENTION

Description of Embodiments of Present Disclosure

Figure 1:
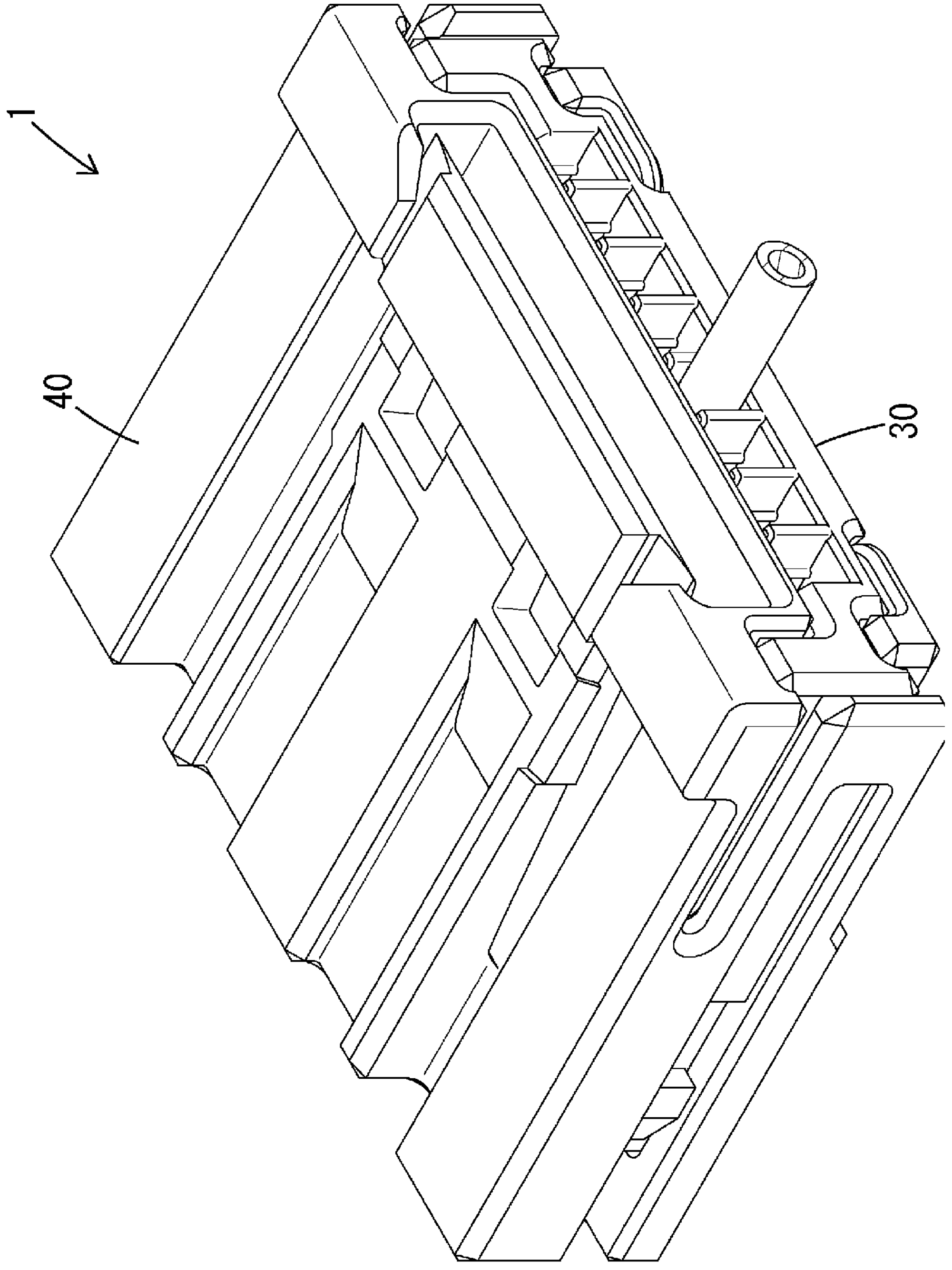
FIG. 1 is a perspective view showing an example of a female connector according to one embodiment.

First, embodiments of the present disclosure are listed and described.

(1) The female connector of the present disclosure is provided with a housing and a female terminal fitting to be accommodated into the housing, the female terminal fitting including a spring member having a pair of resilient pieces and a flat plate member to be held in contact with the resilient pieces, the spring member being provided with an accommodation space between the pair of resilient pieces, the flat plate member and a mating terminal entering the accommodation space to be connected, and the accommodation space being open to face an inner side wall of the housing.

According to the female terminal fitting of the present disclosure, the accommodation space for accommodating the flat plate member is provided between the pair of resilient pieces of the spring member, and the opening of the spring member is facing the inner side wall of the housing. Thus, a box portion for surrounding the flat plate member is not present. Since the female terminal fitting includes no box portion for surrounding the flat plate member as just described, the structure of the female terminal fitting can be simplified.

(2) Preferably, the flat plate member is inserted into the accommodation space from one side, the mating terminal is inserted into the accommodation space from a side opposite to the one side, and the mating terminal has a higher strength than the flat plate member.

According to this configuration, since the mating terminal having a higher strength than the flat plate member is inserted into the accommodation space of the spring member after the flat plate member, the flat plate member is hardly buckled.

(3) Preferably, the flat plate member and the mating terminal are accommodated in a stacked state in the accommodation space.

According to this configuration, a length of the spring member in an insertion direction into the accommodation space can be reduced as compared to a configuration in which the flat plate member and the mating terminal are arranged side by side in the insertion direction into the accommodation space without being stacked.

(4) Preferably, the housing includes a first housing provided with a cavity for accommodating the flat plate member and a second housing displaceable between a temporary locking position and a complete locking position with respect to the first housing, the flat plate member is provided with a connecting portion to be connected to a wire, and the first housing is provided with a cut portion for exposing the connecting portion of the flat plate member accommodated in the cavity with the second housing located at the temporary locking position.

According to this configuration, welding or the like can be applied to the connecting portion via the cut portion with the flat plate member accommodated in the cavity, wherefore the flat plate member and the wire are more easily connected.

(5) Preferably, the housing is provided with a cavity for accommodating the flat plate member, the flat plate member is connected to a wire, and a wall part of the cavity is provided with a holding portion for holding the wire by projecting.

According to this configuration, since the wire is held by the holding portion, it is possible to suppress the application of an unnecessary force to a connected part of the flat plate member and the wire.

(6) Preferably, one of the resilient pieces is provided with a first guide portion for guiding insertion of the mating terminal into the accommodation space, and the other resilient piece is provided with a second guide portion for guiding insertion of the flat plate member into the accommodation space.

According to this configuration, the structure of the spring member can be simplified as compared to a configuration in which the both resilient pieces are provided with parts for guiding both of the mating terminal and the flat plate member.

Details of Embodiment of Present Disclosure

Embodiment

One specific embodiment of a female connector of the present disclosure is described with reference to FIGS. 1 to 15. In this embodiment, upper and lower sides shown in FIGS. 1, 2, 4 to 10, 11, 13 and 15 are directly defined as upper and lower sides concerning a vertical direction. Left and right sides shown in FIGS. 1 to 3, 7 to 9 and 12 to 15 are respectively defined as front and rear sides concerning a front-rear direction. Upper and lower sides shown in FIGS. 3, 9, 12 and 14 are respectively defined as left and right sides concerning a lateral direction.

(Configuration of Female Connector)

Figure 2:
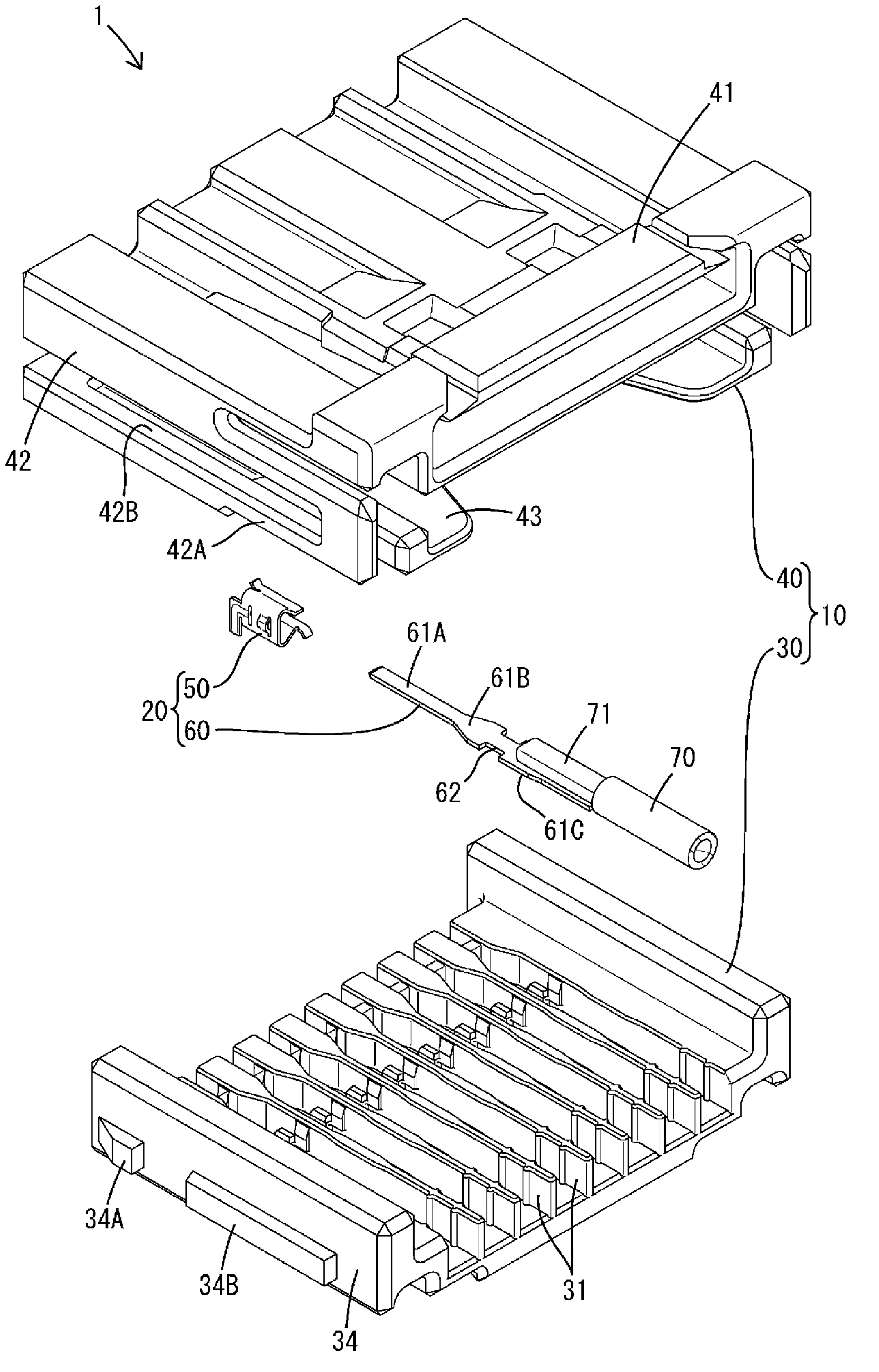
FIG. 2 is an exploded perspective view of FIG. 1.

A female connector 1 of this embodiment is provided with a housing 10 and female terminal fittings 20 as shown in FIGS. 1 and 2. The female terminal fitting 20 is accommodated in the housing 10. The female terminal fitting 20 is fixed to a wire 70. The wire 70 is drawn out rearward from the housing 10.

Figure 8:
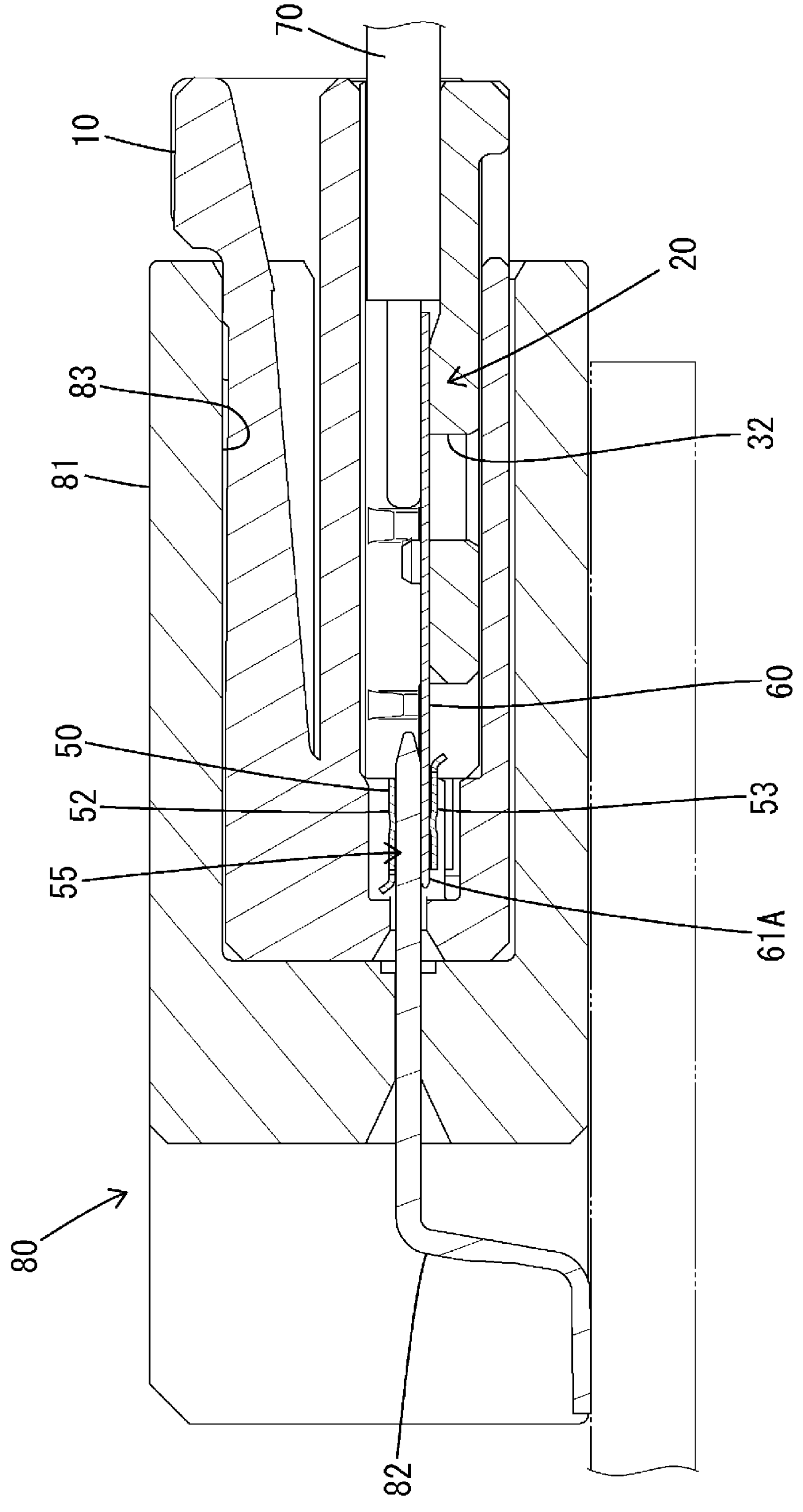
FIG. 8 is a section of the female connector and a male connector in an assembled state when viewed from left.

As shown in FIG. 8, the female connector 1 is connected to a male connector 80. The male connector 80 is, for example, provided with a male housing 81 and male terminal fittings 82. The male terminal fitting 82 corresponds to an example of a "mating terminal." By inserting the housing 10 into the male housing 81, the female terminal fittings 20 and the male terminal fittings 82 are connected.

As shown in FIG. 2, the housing 10 includes a first housing 30 and a second housing 40. Each of the first and second housings 30, 40 is a single component made of synthetic resin. The housing 10 is configured by assembling the first and second housings 30, 40.

Figure 3:
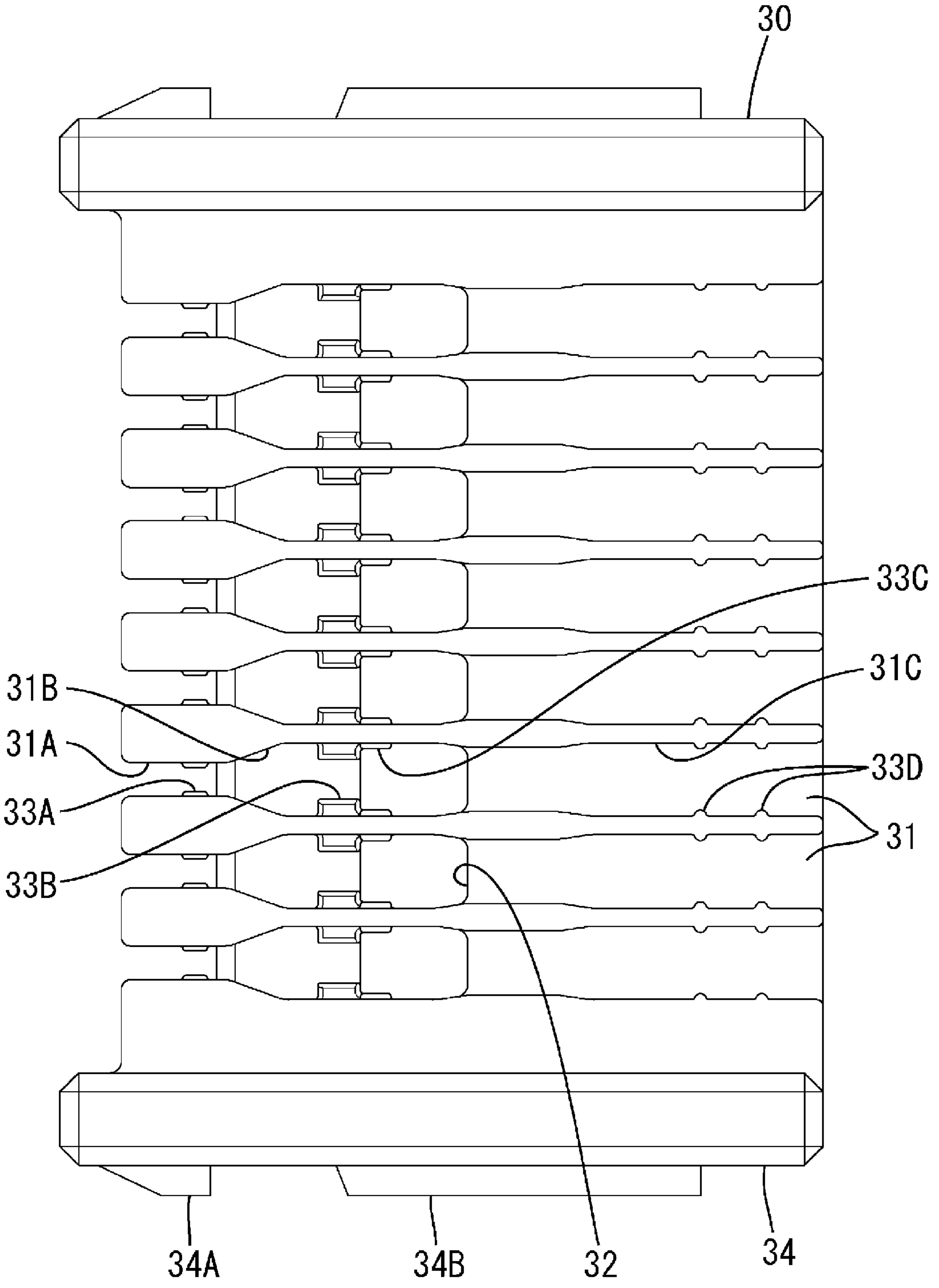
FIG. 3 is a plan view of a first housing.

As shown in FIGS. 2 and 3, the first housing 30 has a flat shape long in the lateral direction. The first housing 30 is provided with a plurality of cavities 31. The female terminal fittings 20 are accommodated in the cavities 31. Note that a state where the female terminal fitting 20 is accommodated in one cavity 31 is illustrated in FIGS. 1, 2, 9, 12 and 14. The plurality of cavities 31 are arranged side by side in a row in the lateral direction. The cavity 31 is long in the front-rear direction.

As shown in FIG. 3, the cavity 31 includes a front accommodating portion 31A, a middle accommodating portion 31B and a rear accommodating portion 31C. The front accommodating portion 31A constitutes a front end part of the cavity 31. The rear accommodating portion 31C constitutes a rear end part of the cavity 31 and most of the cavity 31. The middle accommodating portion 31B constitutes a part between the front accommodating portion 31A and the rear accommodating portion 31C in the cavity 31. A lateral width of the front accommodating portion 31A is smaller than that of the rear accommodating portion 31C. A lateral width of the middle accommodating portion 31B becomes smaller toward the front.

In a lower wall constituting the rear accommodating portion 31C, a cut portion 32 penetrating in the vertical direction is provided at a position slightly behind a front end. The cut portion 32 has a rectangular shape. First protuberances 33A projecting in the lateral direction are provided on both left and right walls of the front accommodating portion 31A. The upper end of the first protuberance 33A is inclined outward toward top. Second protuberances 33B projecting in the lateral direction are provided on the both left and right walls forward of the cut portion 32 in the rear accommodating portion 31C. The upper end of the second protuberance 33B is inclined outward toward top. Third protuberances 33C projecting in the lateral direction are provided at positions overlapping the cut portion 32 (positions behind and adjacent to the second protuberances 33B) in the rear accommodating portion 31C. The upper end of the third protuberance 33C is inclined outward toward top. Fourth protuberances 33D projecting in the lateral direction are provided on the both left and right walls at positions near the rear end of the rear accommodating portion 31C. The fourth protuberances 33D are provided on the both left and right walls of the rear accommodating portion 31C entirely in the vertical direction. A pair of the fourth protuberances 33D are provided on each of the both left and right walls of the rear accommodating portion 31C.

As shown in FIGS. 2 and 3, the first housing 30 includes a pair of side walls 34. The side wall 34 is formed to be long in the front-rear direction from a front end side to a rear end side of the first housing 30. A first locking piece 34A and a second locking piece 34B are provided on the outer surface (surface on a side opposite to the other side wall 34) of the side wall 34. The first locking piece 34A is provided slightly behind the front end of the side wall 34. The first locking piece 34A is a projection trapezoidal in a plan view. The front end of the first locking piece 34A is inclined inward (toward the other side wall 34) toward the front. The second locking piece 34B is provided away from the first locking piece 34A on a rear end side of the side wall 34. The second locking piece 34B is a projection long in the front-rear direction.

Figure 4:
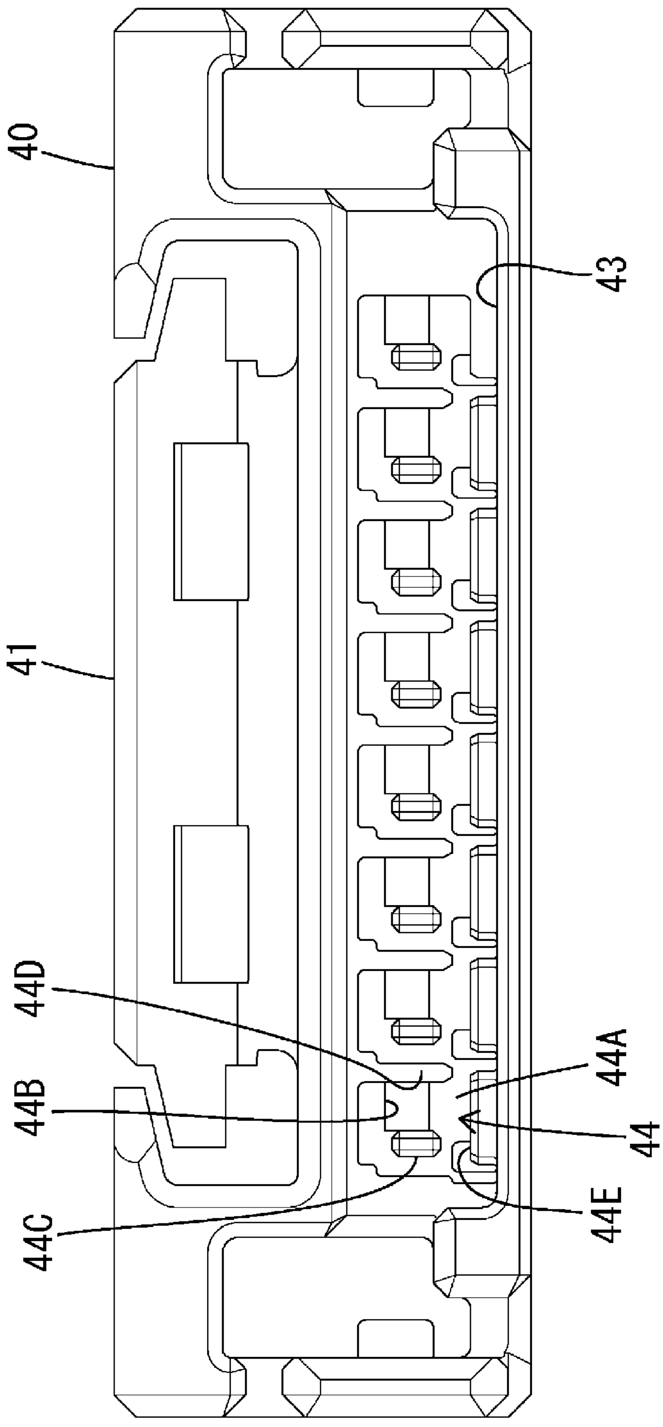
FIG. 4 is a back view of the first housing.

As shown in FIGS. 2 and 4, the second housing 40 has a flat shape long in the lateral direction. A cantilevered and deflectable lock arm 41 is provided in a lateral central part of the upper surface of the second housing 40. The second housing 40 includes a pair of side walls 42. The side wall 42 is formed to be long in the front-rear direction from a front end side to a rear end side of the second housing 40. A rear end side of the side wall 42 is configured as a variable portion 42A. The variable portion 42A is U-shaped in a side view. A slit is provided between the variable portion 42A and the upper wall of the second housing 40, and the variable portion 42A is resiliently deformable in the lateral direction. The side wall 42 is provided with a hole 42B. The hole 42B penetrates through the side wall 42 in the lateral direction. The hole 42B has a shape long in the front-rear direction from a front end side of the side wall 42 to the variable portion 42A.

As shown in FIGS. 2 and 4, the second housing 40 is provided with an internal space 43. The internal space 43 is open rearward. A plurality of accommodating portions 44 for accommodating spring members 50 to be described later are provided in the front end of the internal space 43. A front wall 44A of the accommodating portion 44 is constituted by the front wall of the second housing 40. The front wall 44A is provided with a hole 44B penetrating in the front-rear direction. A first projecting portion 44C projecting rearward is provided to the right (to the left in FIG. 4) of the hole 44B in the rear surface of the front wall 44A. A left wall (right wall in FIG. 4) of the accommodating portion 44 is configured as an inner side wall 44D extending downward from an upper wall. The inner side wall 44D extends downward from the upper wall. The inner side wall 44D is separated from the lower wall of the accommodating portion 44. The lower wall of the accommodating portion 44 is provided with a second projecting portion 44E projecting upward.

Figure 9:
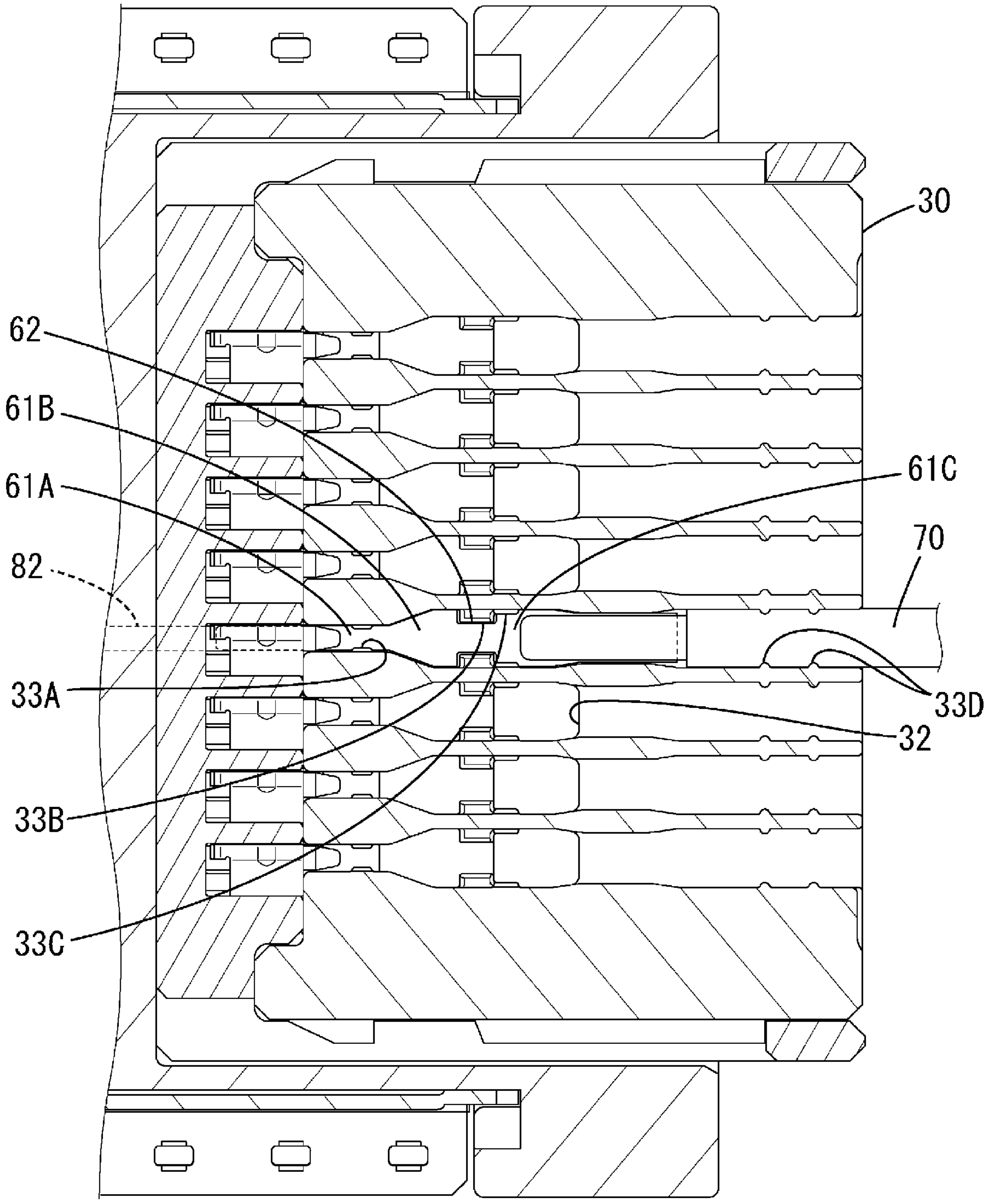
FIG. 9 is a plan view in section of the female connector and the male connector in the assembled state.

As shown in FIGS. 8 and 9, the first and second housings 30, 40 are assembled by accommodating the first housing 30 into the internal space 43. The upper end of the cavity 31 is closed by the upper wall of the second housing 40. The first and second housings 30, 40 are completely locked by inserting the first and second locking pieces 34A, 34B into the holes 42B.

Figure 5:
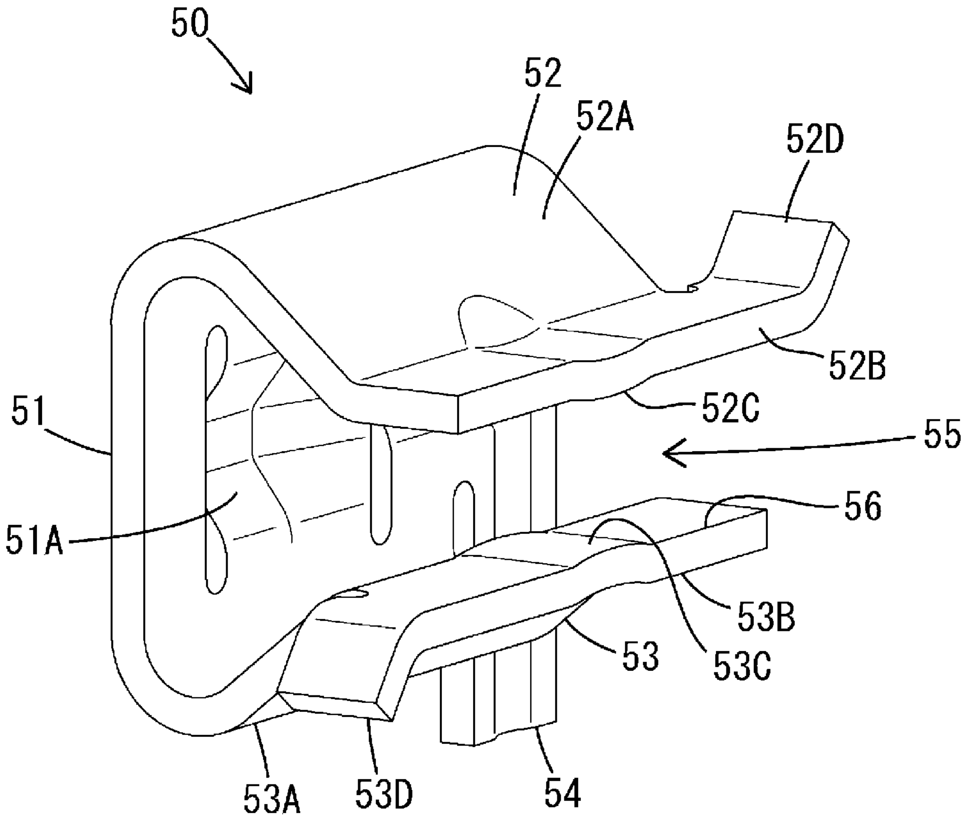
FIG. 5 is a perspective view of a spring member when viewed from a rear right side.
Figure 6:
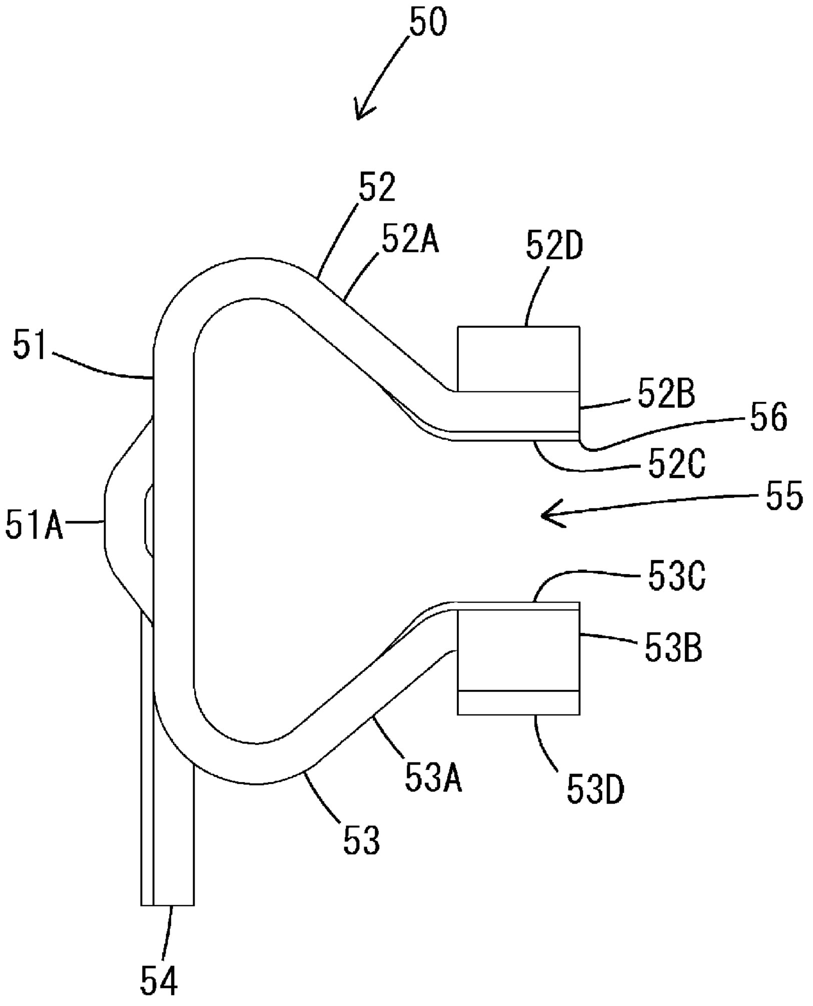
FIG. 6 is a back view of the spring member.
Figure 7:
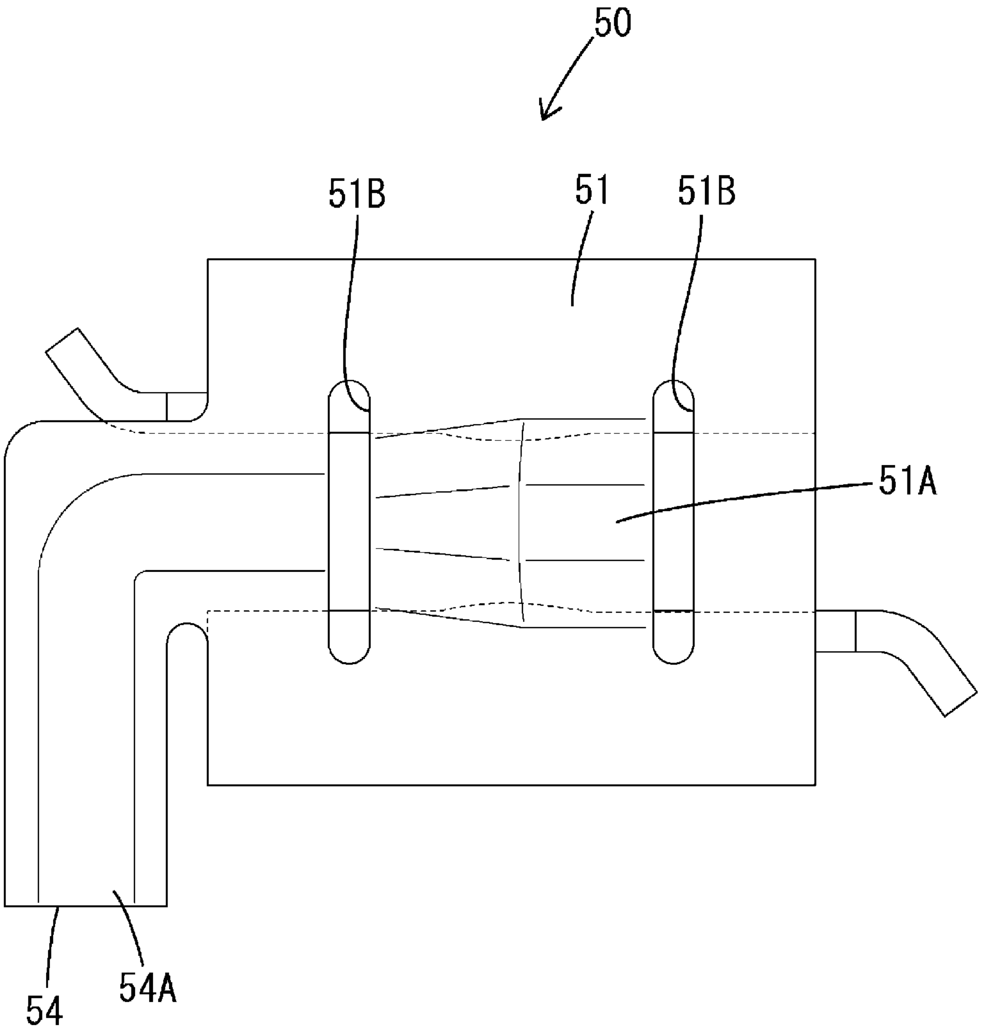
FIG. 7 is a left side view of the spring member.

As shown in FIG. 2, the female terminal fitting 20 includes the spring member 50 and a flat plate member 60. The spring member 50 and the flat plate member 60 are manufactured as components separate from each other. The spring member 50 constitutes a front end part of the female terminal fitting 20. The spring member 50 is, for example, made of SUS (stainless steel) or the like. The spring member 50 is a single component made of the same material. As shown in FIGS. 5 to 7, the spring member 50 includes a base portion 51, a pair of resilient pieces 52, 53 and an extending portion 54. The base portion 51 is in the form of a rectangular plate. A first protrusion 51A bulging rightward (leftward in FIGS. 5 and 6) is provided in a center of the base portion 51. The first protrusion 51A is formed by press-working to bulge via a pair of cuts 51B (see FIG. 7) along the vertical direction. The front end (left end in FIG. 7) of the first protrusion 51A has a vertical width reduced toward the front (left in FIG. 7).

The resilient piece 52 extends leftward (rightward in FIGS. 5 and 6) from the upper edge of the base portion 51. The resilient piece 52 includes a first piece 52A and a second piece 52B. The first piece 52A is curved from the upper edge of the base portion 51 to be convex upward. The first piece 52A has a shape inclined downward toward a tip (left end part). The second piece 52B extends leftward (rightward in FIGS. 5 and 6) from the tip of the first piece 52A. A second protrusion 52C projecting downward is provided in a center in the front-rear direction of the second piece 52B. The front end of the second piece 52B is provided with a first guide portion 52D. The first guide portion 52D projects further forward than the base portion 51 and the first piece 52A. The first guide portion 52D is inclined upward (toward a side opposite to the resilient piece 53) toward the front.

The resilient piece 53 extends leftward (rightward in FIGS. 5 and 6) from the lower edge of the base portion 51. The resilient piece 53 includes a first piece 53A and a second piece 53B. The first piece 53A is curved from the lower edge of the base portion 51 to be convex downward. The first piece 53A has a shape inclined upward toward a tip (left end part). The second piece 53B extends leftward (rightward in FIGS. 5 and 6) from the tip of the first piece 53A. A second protrusion 53C projecting upward is provided in a center in the front-rear direction of the second piece 53B. The front end of the second piece 53B is provided with a second guide portion 53D. The second guide portion 53D projects further rearward than the base portion 51 and the first piece 53A. The second guide portion 53D is inclined downward (toward a side opposite to the resilient piece 52) toward the rear.

As shown in FIG. 7, the extending portion 54 extends from the front edge of the base portion 51. The extending portion 54 extends forward and then downward. The extending portion 54 is provided with a third protrusion 54A projecting rightward along an extension direction thereof.

Figure 10:
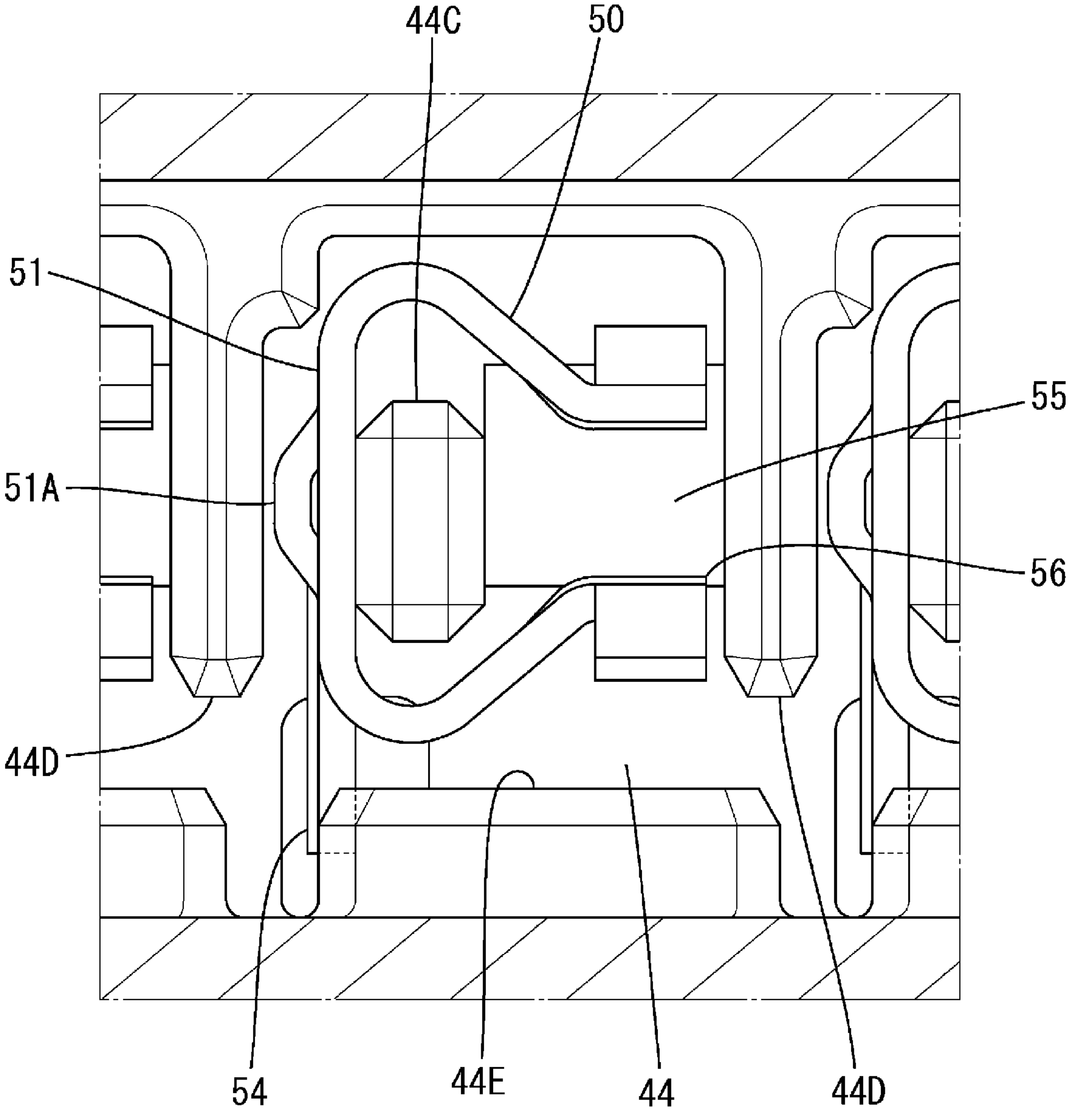
FIG. 10 is a section showing the spring member and the periphery of the spring member in the female connector with a flat plate member omitted when viewed from behind.

As shown in FIG. 10, the spring member 50 is accommodated in the accommodating portion 44. As shown in FIG. 10, the base portion 51 is arranged in a gap between the first projecting portion 44C and the inner side wall 44D of the accommodating portion 44 adjacent on a right side (left side in FIG. 10). A movement of the base portion 51 in the lateral direction is restricted by the first projecting portion 44C and the inner side wall 44D of the accommodating portion 44 adjacent on the right side (left side in FIG. 10). The extending portion 54 is arranged in front of the right end of the second projecting portion 44E. A rearward movement of the extending portion 54 is restricted by the second projecting portion 44E.

As shown in FIGS. 5 and 6, the spring member 50 is provided with an accommodation space 55 between the pair of resilient pieces 52 and 53. The accommodation space 55 is a space into which the flat plate member 60 and the male terminal fitting 82 enter to be connected. The accommodation space 55 is provided with an opening 56 open to face the inner side wall 44D of the second housing 40. The opening 56 is constituted by the left edge (right edge in FIGS. 5 and 6) of the second piece 52B and the left edge (right edge in FIGS. 5 and 6) of the second piece 53B. The opening 56 is open leftward (rightward in FIGS. 6 and 10). As shown in FIG. 10, the opening 56 is covered by the inner side wall 44D of the second housing 40.

The spring member 50 is provided with the accommodation space 55 for accommodating the flat plate member 60, and the opening 56 thereof is covered by the inner side wall 44D of the second housing 40. That is, the female terminal fitting 20 is configured to provide a spring function for the flat plate member 60 to another member (spring member

50). This spring member 50 does not include a rectangular tube portion (composed of four plate portions) and the resilient pieces 52, 53 are exposed on the outer surface of the spring member 50. Since the female terminal fitting 20 includes no rectangular tube portion for surrounding the flat plate member 60, the structure of the female terminal fitting 20 can be simplified. Consequently, a manufacturing cost reduction and miniaturization of the female terminal fitting 20 can be realized.

As shown in FIG. 2, the flat plate member 60 is constituted by a long plate member. The flat plate member 60 is, for example, made of tin-plated aluminum. The flat plate member 60 includes a first plate portion 61A, a second plate portion 61B and a third plate portion 61C. In the flat plate member 60, the first, second and third plate portions 61A, 61B and 61C are connected in this order from front. The first plate portion 61A has a rectangular shape in a plan view. The second plate portion 61B is in the form of a plate widened from a front side toward a rear side. The third plate portion 61C has a rectangular shape in a plan view. The third plate portion 61C is wider than the first plate portion 61A. A pair of recesses 62 recessed inward in the lateral direction are provided at positions of the third plate portion 61C slightly behind a front end.

As shown in FIG. 2, the wire 70 is connected to the flat plate member 60. Specifically, a conductor wire 71 drawn out from the wire 70 is connected to the third plate portion 61C by welding (ultrasonic welding, etc.), crimping or the like. The third plate portion 61C corresponds to an example of a "connecting portion" of the present disclosure.

As shown in FIG. 9, the flat plate member 60 is accommodated in the cavity 31. The first plate portion 61A is located below the pair of first protuberances 33A. In this way, an upward movement of the first plate portion 61A is restricted by the pair of first protuberances 33A. The pair of second protuberances 33B respectively enter the pair of recesses 62. Since movements of the recesses 62 in the front-rear direction are restricted by the second protuberances 33B, a movement of the flat plate member 60 in the front-rear direction with respect to the cavity 31 is restricted. The third plate portion 61C is located below the pair of third protuberances 33C. In this way, an upward movement of the third plate portion 61C is restricted by the pair of third protuberances 33C. The front end (part connected to the wire 70) of the third plate portion 61C overlaps the cut portion 32 in the vertical direction.

As shown in FIG. 9, the wire 70 is in contact with four fourth protuberances 33D. The fourth protuberances 33D constitute a strain relief structure for the wire 70. The fourth protuberances 33D correspond to a "holding portion" of the present disclosure. The fourth protuberances 33D hold the wire 70. In this way, the fourth protuberances 33D can suppress the application of an unnecessary force to the connected part of the flat plate member 60 and the wire 70.

Figure 11:
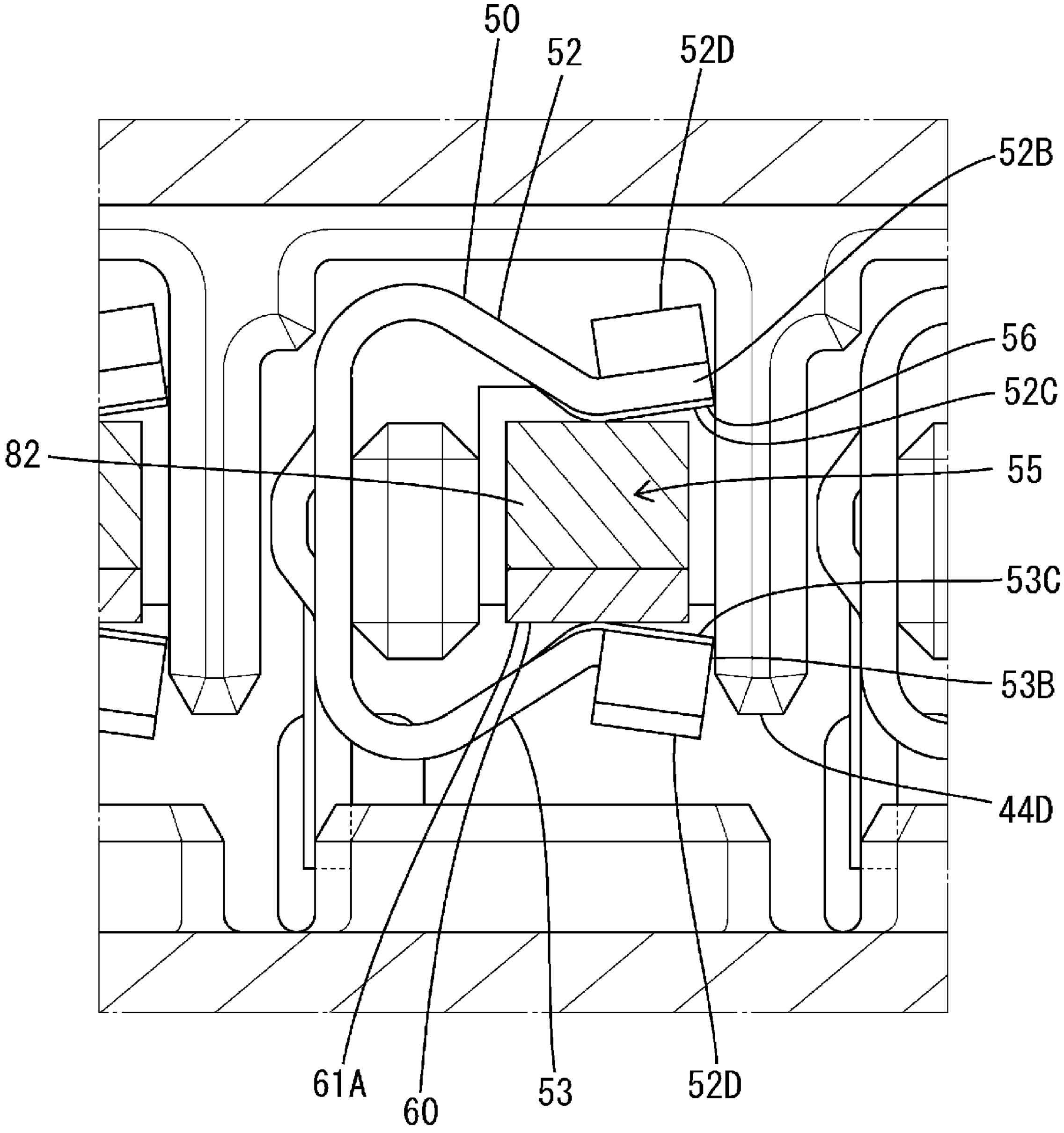
FIG. 11 is a section showing a state where the flat plate member and a mating terminal are inserted in an accommodation space in FIG. 10.

As shown in FIG. 8, the first plate portion 61A of the flat plate member 60 is inserted into the accommodation space 55 of the spring member 50 from behind (corresponding to "one side" of the present disclosure). As shown in FIG. 11, the first plate portion 61A is in contact with the lower resilient piece 53 from above. Specifically, the first plate portion 61A is in contact with the second protrusion 53C from above. In inserting the flat plate member 60 into the accommodation space 50 from behind, the insertion of the flat plate member 60 into the accommodation space 55 is guided by the first guide portion 52D.

As shown in FIG. 8, the male terminal fitting 82 is inserted into the accommodation space 55 of the spring member 50 from front (corresponding to "another side" of the present disclosure). As shown in FIG. 11, the male terminal fitting 82 is in contact with the upper resilient piece 52 from below. Specifically, the male terminal fitting 82 is in contact with the second protrusion 52C from below. In inserting the male terminal fitting 82 into the accommodation space 50 from front, the insertion of the male terminal fitting 82 into the accommodation space 55 is guided by the second guide portion 53D.

As shown in FIG. 11, the flat plate member 60 and the male terminal fitting 82 enter the accommodation space 55 to be connected. The flat plate member 60 and the male terminal fitting 82 are accommodated in a stacked state in the accommodation space 55. Specifically, the flat plate member 60 and the male terminal fitting 82 overlap in the vertical direction while being vertically sandwiched by the pair of resilient pieces 52, 53 resiliently deformed outward in the vertical direction.

As shown in FIG. 11, the male terminal fitting 82 has a larger vertical thickness than the flat plate member 60. The male terminal fitting 82 has a higher strength than the flat plate member 60. Since the male terminal fitting 82 having a higher strength than the flat plate member 60 is inserted into the accommodation space 55 of the spring member 50 after the flat plate member 60, the flat plate member 60 is hardly buckled.

(Manufacturing Process of Female Connector)

Figure 12:
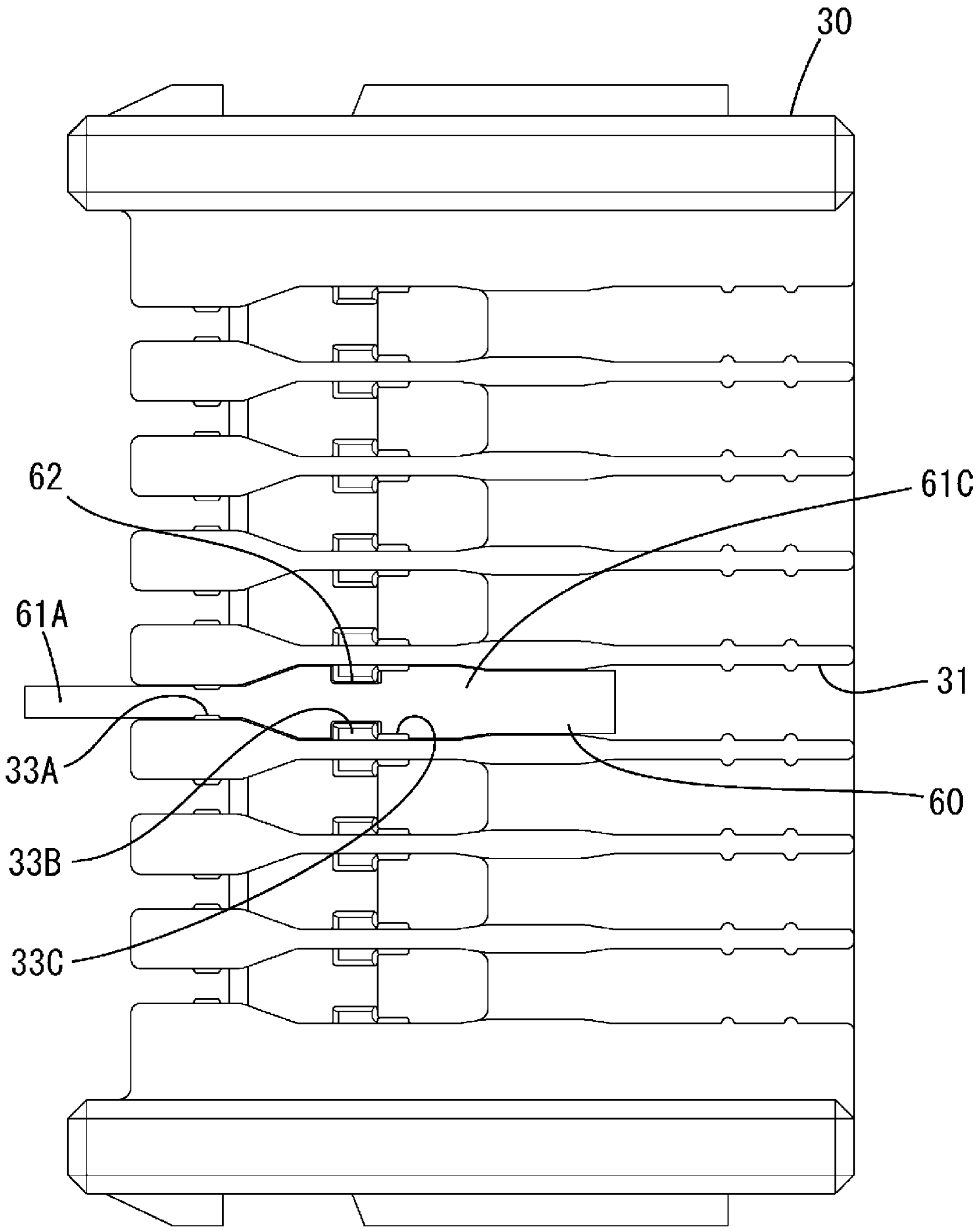
FIG. 12 is a plan view showing a step of mounting the flat plate member into the first housing in a female connector manufacturing method according to the embodiment.

A manufacturing process of the female connector 1 is described using FIGS. 12 to 15. FIGS. 12 to 15 are diagrams showing a flow of the manufacturing process of the female connector 1. First, as shown in FIG. 12, the flat plate member 60 is assembled into the cavity 31 of the first housing 30. The first plate portion 61A is arranged below the pair of first protuberances 33A. The pair of second protuberances 33B are respectively caused to enter the pair of recesses 62. The third plate portion 61C is arranged below the pair of third protuberances 33C. In such a state, the front end (part connected to the wire 70) of the third plate portion 61C overlaps the cut portion 32 in the vertical direction.

Subsequently, the spring member 50 is accommodated into the accommodating portion 44 of the second housing 40. In the process of inserting the spring member 50 into the accommodating portion 44 from behind, the extending portion 54 is resiliently deformed rightward by the second projecting portion 44E. The extending portion 54 rides over the second projecting portion 44E, thereby being arranged in front of the right end of the second projecting portion 44E as shown in FIG. 10. In this way, a rearward movement of the extending portion 54 is restricted by the second projecting portion 44E and the spring member 50 is suppressed from coming out from the accommodating portion 44.

Figure 13:
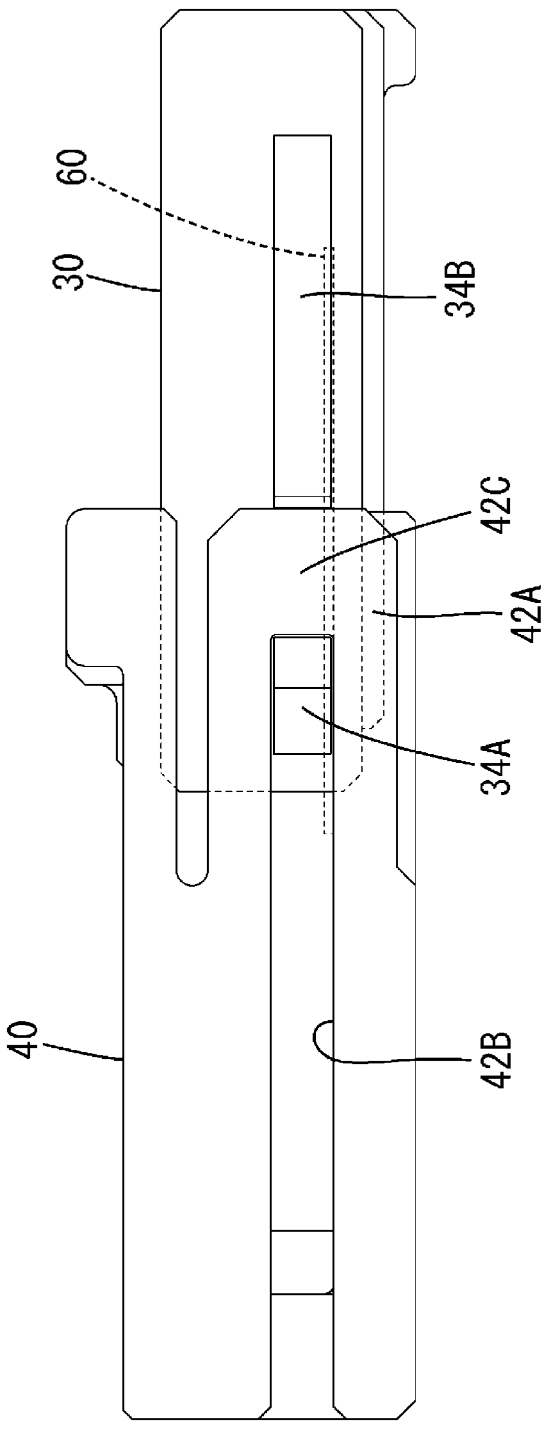
FIG. 13 is a plan view showing a step of temporarily locking the first housing and a second housing, following the step of FIG. 12.

Subsequently, as shown in FIG. 13, the first and second housings 30, 40 are temporarily locked. The first housing 30 is caused to enter the internal space 43 of the second housing 40 while expanding the pair of variable portions 42A outward in the lateral direction. The first locking pieces 34A enter the holes 42B of the variable portions 42A and the variable portions 42A resiliently return, whereby tips 42C (vertically continuous parts) of the variable portions 42A are sandwiched by the first locking pieces 34A and the second locking pieces 34B. In this way, the first and second housings 30, 40 are temporarily locked.

Figure 14:
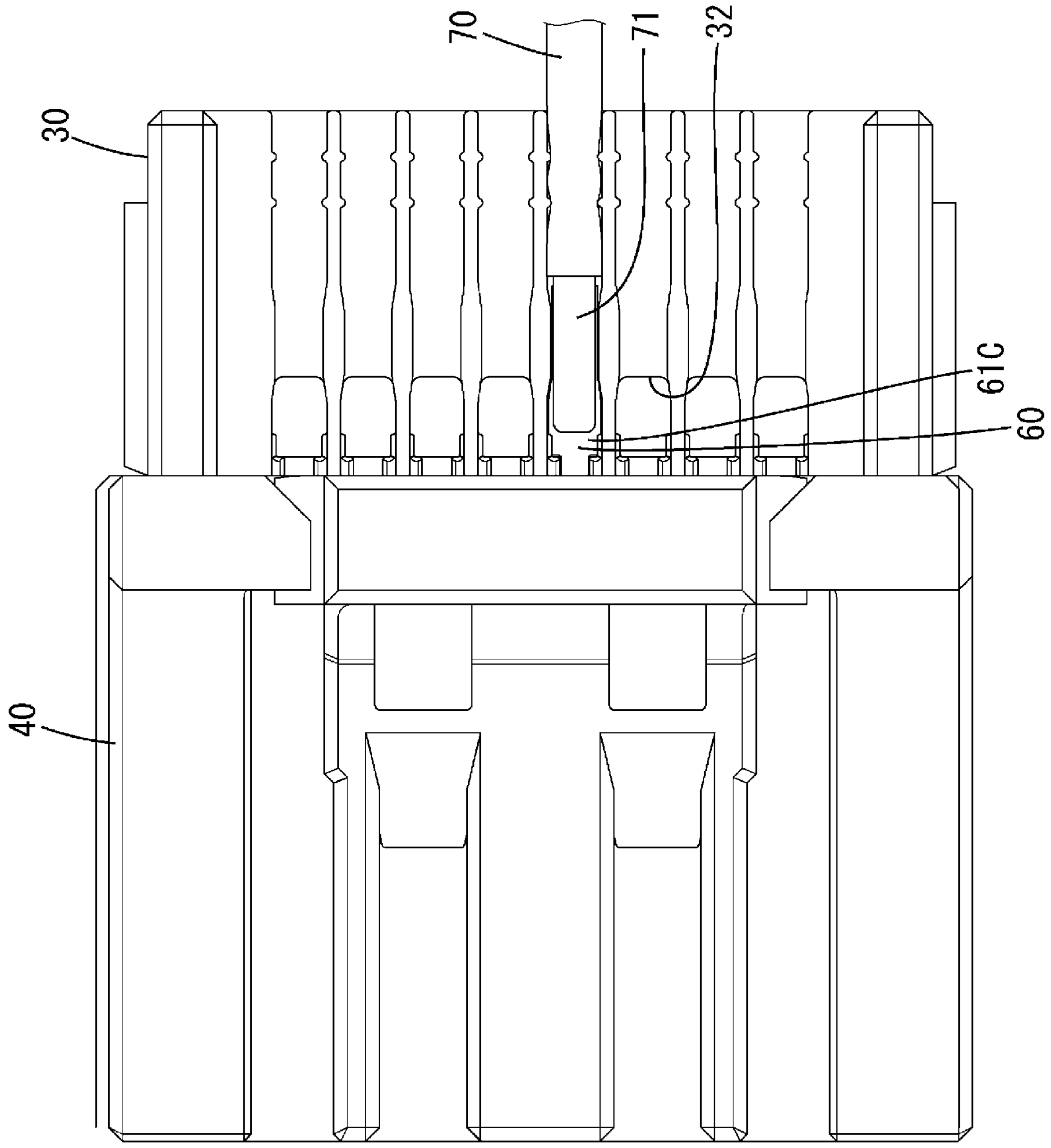
FIG. 14 is a plan view showing a step of connecting a wire to the flat plate member, following the step of FIG. 13.

Subsequently, as shown in FIG. 14, the front end of the third plate portion 61C of the flat plate member 60 accommodated in the cavity 31 is exposed downward via the cut portion 32. The front end of the third plate portion 61C and the connected part of the wire 70 are connected by welding (ultrasonic welding, etc.) or the like via the cut portion 32.

Figure 15:
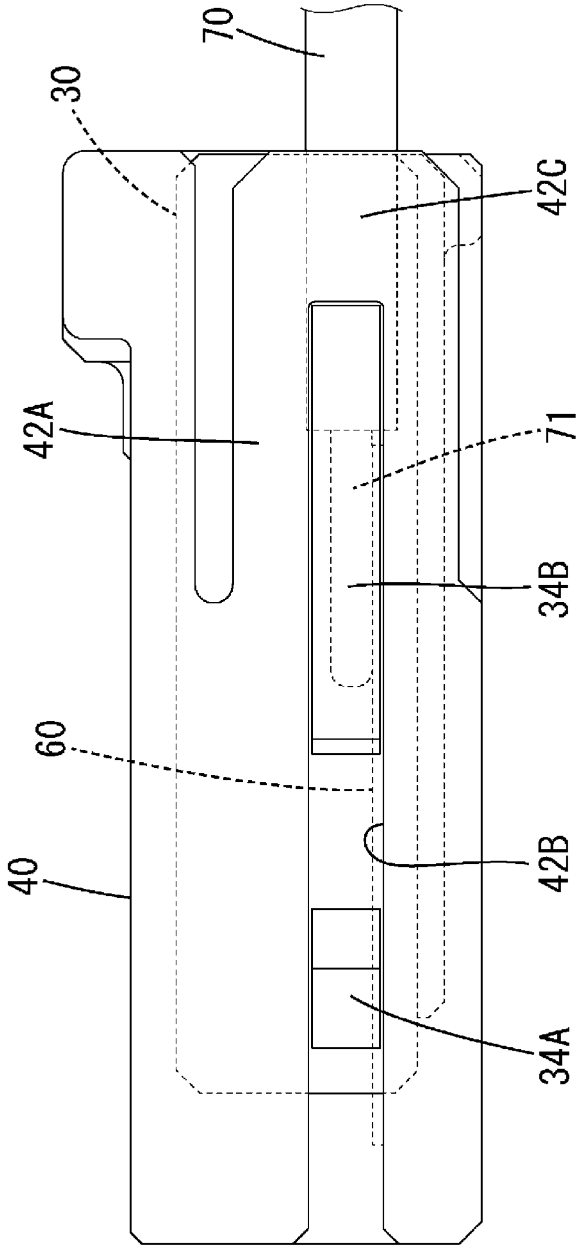
FIG. 15 is a plan view showing a step of completely locking the first housing and the second housing, following the step of FIG. 14.

Subsequently, as shown in FIG. 15, the first and second housings 30, 40 are completely locked. The first housing 30 is caused to further enter the internal space 43 of the second housing 40 while expanding the pair of variable portions 42A outward in the lateral direction. The second locking pieces 34B enter the holes 42B of the variable portions 42A and the variable portions 42A resiliently return, whereby rearward movements of the second locking pieces 34B are restricted by the tips 42C of the variable portions 42A. In this way, the first and second housings 30, 40 are completely locked.

Effects of Embodiment

According to the female terminal fitting 20 of the female connector 1 of this embodiment, the accommodation space 55 for accommodating the flat plate member 60 is provided between the pair of resilient pieces 52, 53 of the spring member 50 and the opening 56 of the spring member 50 is facing the inner side wall 44D of the housing 10. Thus, a box portion for surrounding the flat plate member 60 is not present. Since the female terminal fitting 20 includes no box portion for surrounding the flat plate member 60 as just described, the structure of the female terminal fitting 20 can be simplified.

Further, the flat plate member 60 is inserted into the accommodation space 55 from the one side. The male terminal fitting 82 is inserted into the accommodation space 55 from the side opposite to the one side with the flat plate member 60 accommodated in the accommodation space 55. The male terminal fitting 82 has a higher strength than the flat plate member 60. According to this configuration, since the male terminal fitting 82 having a higher strength than the flat plate member 60 is inserted into the accommodation space 55 of the spring member 50 after the flat plate member 60, the flat plate member 60 is hardly buckled.

Further, the flat plate member 60 and the male terminal fitting 82 are accommodated in the accommodation space 55 while being stacked in the same direction as a facing direction of the pair of resilient pieces 52, 53. According to this configuration, a length of the spring member 50 in a direction along an insertion direction into the accommodation space 55 can be reduced as compared to a configuration in which the flat plate member 60 and the male terminal fitting 82 are arranged side by side in the insertion direction into the accommodation space 55 without being stacked.

Further, the housing 10 includes the first housing 30 provided with the cavities 31 for accommodating the flat plate members 60 and the second housing 40 displaceable between a temporary locking position and a complete locking position with respect to the first housing 30. The flat plate member 60 is provided with the third plate portion 61C to be connected to the wire 70. The first housing 30 is provided with the cut portions 32 for exposing the third plate portions 61C of the flat plate members 60 accommodated in the cavities 31 with the second housing 40 located at the temporary locking position. According to this configuration, welding or the like can be applied to the third plate portion 61C via the cut portion 32 with the flat plate member 60 accommodated in the cavity 31, wherefore the flat plate member 60 and the wire 70 are more easily connected.

Further, the housing 10 is provided with the cavities 31 for accommodating the flat plate members 60. The flat plate member 60 is connected to the wire 70. The wall parts of the cavity 31 are provided with the fourth protuberances 33D for holding the wires 70 by projecting. According to this configuration, since the wire 70 is held by the fourth protuberances 33D, it is possible to suppress the application of an unnecessary force to the connected part of the flat plate member 60 and the wire 70.

Further, the resilient piece 52 is provided with the first guide portion 52D for guiding the insertion of the male terminal fitting 82 into the accommodation space 55. The resilient piece 53 is provided with the second guide portion 53D for guiding the insertion of the flat plate member 60 into the accommodation space 55. According to this configuration, the structure of the spring member 50 can be simplified as compared to a configuration in which the both resilient pieces 52, 53 are provided with parts for guiding both of the male terminal fitting 82 and the flat plate member 60.

OTHER EMBODIMENTS

The present invention is not limited to the described and illustrated embodiment, but is represented by claims. The present invention is intended to include all changes in the scope of claims and in the meaning and scope of equivalents and also include the following embodiments.

Although the flat plate member 60 and the male terminal fitting 82 are illustrated to contact each other in the vertical direction in the accommodation space 55 of the spring member 50 in the above embodiment, the flat plate member 60 and the male terminal fitting 82 may not contact each other. In this case, the flat plate member 60 and the male terminal fitting 82 are made conductive via the spring member 50, for example, by holding the flat plate member 60 in contact with the resilient piece 53 and holding the male terminal fitting 82 in contact with the resilient piece 52.

Although the flat plate member 60 and the male terminal fitting 82 are illustrated to be stacked in the vertical direction in the above embodiment, these may not be stacked. For example, the front end of the flat plate member 60 and the rear end of the male terminal fitting 82 may overlap in the front-rear direction.

Although the accommodation space 55 of the spring member 50 is illustrated to be open leftward in the above embodiment, the accommodation space 55 may be open in another direction. For example, a configuration obtained by laterally inverting the shape of the spring member 50 of the above embodiment, a configuration in which the opening 56 of the accommodation space 55 is facing upward or the like configuration may be adopted.

LIST OF REFERENCE NUMERALS

1 . . . female connector
10 . . . housing
20 . . . female terminal fitting
30 . . . first housing
31 . . . cavity
31A . . . front accommodating portion
31B . . . middle accommodating portion
31C . . . rear accommodating portion
32 . . . cut portion
33A . . . first protuberance
33B . . . second protuberance
33C . . . third protuberance
33D . . . fourth protuberance (holding portion)
34 . . . side wall
34A . . . first locking piece
34B . . . second locking piece
40 . . . second housing

41 . . . lock arm
42 . . . side wall
42A . . . variable portion
42B . . . hole
42C . . . tip
43 . . . internal space
44 . . . accommodating portion
44A . . . front wall
44B . . . hole
44C . . . first projecting portion
44D . . . inner side wall
44E . . . second projecting portion
50 . . . spring member
51 . . . base portion
51A . . . first protrusion
51B . . . cut
52, 53 . . . resilient piece
52A . . . first piece
52B . . . second piece
52C . . . second protrusion
52D . . . first guide portion
53A . . . first piece
53B . . . second piece
53C . . . second protrusion
53D . . . second guide portion
54 . . . extending portion
54A . . . third protrusion
55 . . . accommodation space
56 . . . opening
60 . . . flat plate member
61A . . . first plate portion
61B . . . second plate portion
61C . . . third plate portion (connecting portion)
62 . . . recess
70 . . . wire
71 . . . conductor wire
80 . . . male connector
81 . . . male housing
82 . . . male terminal fitting (mating terminal)

What is claimed is:

1. A female connector, comprising:
a housing; and
a female terminal fitting to be accommodated into the housing,
the female terminal fitting including:
a spring member having a pair of resilient pieces; and
a flat plate member to be held in contact with the resilient pieces,
the spring member being provided with an accommodation space between the pair of resilient pieces,
the flat plate member and a mating terminal entering the accommodation space to be connected,
the accommodation space being open to face an inner side wall of the housing,
the housing being configured by assembling a first housing and a second housing,
a plurality of the flat plate members being assembled into the first housing,
a plurality of the spring members being assembled into the second housing, and
the first housing assembled with the plurality of flat plate members and the second housing assembled with the plurality of spring members being assembled by being completely locked from a temporarily locked state.

2. The female connector of claim 1, wherein:
the flat plate member is inserted into the accommodation space from one side,
the mating terminal is inserted into the accommodation space from a side opposite to the one side, and
the mating terminal has a higher strength than the flat plate member.

3. The female connector of claim 1, wherein the flat plate member and the mating terminal are accommodated in a stacked state in the accommodation space.

4. The female connector of claim 1, wherein:
the housing includes:
the first housing provided with a cavity for accommodating the flat plate member; and
the second housing displaceable between a temporary locking position and a complete locking position with respect to the first housing,
the flat plate member is provided with a connecting portion to be connected to a wire, and
the first housing is provided with a cut portion for exposing the connecting portion of the flat plate member accommodated in the cavity with the second housing located at the temporary locking position.

5. The female connector of claim 1, wherein:
the first housing is provided with a cavity for accommodating the flat plate member,
the flat plate member is connected to a wire, and
a wall part of the cavity is provided with a holding portion for holding the wire by projecting.

6. The female connector of claim 1, wherein:
one of the resilient pieces is provided with a first guide portion for guiding insertion of the mating terminal into the accommodation space, and
the other resilient piece is provided with a second guide portion for guiding insertion of the flat plate member into the accommodation space.

* * * * *